Patented Jan. 4, 1949

2,458,432

UNITED STATES PATENT OFFICE 2,458,432

THIOL ESTER MODIFICATION OF SYNTHETIC RUBBERS

William Henry Sharkey, Wilmington, Del., assignor to E. I. du Pont de Nemours & Company, Wilmington, Del., a corporation of Delaware No Drawing. Application December 22, 1944, Serial No. 569,431

11 Claims. (Cl. 260—84.5)

1

This invention relates to polymeric materials and more particularly to an improved process for the preparation of synthetic rubber-like polymers.

This invention has as an object the preparation of modified synthetic rubbers having superior milling properties and good physical properties. A further object is the preparation of a synthetic rubber of superior tensile strength. Other objects will appear hereinafter.

These objects are accomplished by the following invention wherein a polymerizable monomeric composition comprising a major amount of a polymerizable conjugated diene is polymerized in an alkaline medium in the presence of an ester of a lower (one to six carbon) acyclic aliphatic carbothiolic acid, having the acid hydrogen replaced by the radical of an alcohol of at least six carbon atoms preferably that of an aliphatic, including cycloaliphatic, alcohol.

In general, the process of this invention is carried out by dispersing in water a diene, for example butadiene or 2-chlorobutadiene, or a mixture of a diene with minor amounts of one or more polymerizable vinyl or vinylidene compounds, such as styrene or acrylonitrile, and preferably between one and three per cent of an ester of a carbothiolic acid as above defined. The dispersion, in general, is brought about by the use of a dispersant such as an alkali metal salt of a long chain fatty acid. The polymerization is preferably induced by a peroxy catalyst at a temperature of between 20° C. and 70° C. and at a pH preferably between 10.5 and 13.0. The resulting modified polymer is obtained by precipitation from the aqueous dispersion, usually by adding an electrolyte. This polymer is washed and dried and can be milled and further treated in the manner customarily employed in the rubber industry.

The more detailed practice of the invention is illustrated by the following example wherein parts given are by weight. There are, of course, many forms of the invention other than this specific embodiment.

Example

A mixture of 75 parts of butadiene, 25 parts of styrene and three parts 2,4,4-trimethylpentyl thiolacetate was emulsified in 150 parts of water containing one part of the sodium salt of a sulfonated napthalene-formaldehyde condensation product prepared as described in U. S. P. 1,336,759, four parts of oleic acid, 1.1 parts of

2

U. S. P. sodium hydroxide (0.5 part more than was necessary to neutralize the oleic acid), one part of potassium persulfate, and 0.15 part of potassium ferricyanide. This emulsion, which had a pH of 11.5, was heated for 20 hours at 40° C. with vigorous agitation and was then treated with saturated sodium chloride solution and acidified with 10% acetic acid solution to coagulate the rubber-like polymer contained therein. The polymer was washed with water for ten minutes on a mill having a corrugated roll and then dried on a smooth mill. The yield of dry polymer was 93.5 parts. The polymer was easily handled on a mill as it formed a band with a smooth rolling bank and had sufficient mill tack to grip the mill rolls firmly without buckling. This polymer was easily compounded on a mill with carbon black, metal oxides, sulfur, accelerators, etc., for the preparation of vulcanized articles. The yield of a polymer prepared from 75 parts of butadiene and 25 parts of styrene under the same conditions except without the 2,4,4-trimethylpentyl thiolacetate was only 51 parts and this polymer was characterized by poor mill behavior as it was crepe-like, had poor tack, formed a dry, rought bank on a mill, and was difficultly handled in conventional rubber working equipment due to buckling, i. e., failure to grip the mill rolls firmly.

In addition to this improvement in processability, the copolymer prepared in the presence of 2,4,4-trimethylpentyl thiolacetate, when compounded with 50 parts of medium processing channel black, two parts of sulfur, two parts of stearic acid, five parts of zinc oxide and 1.25 parts of 2-mercaptothiazoline and cured for 30 minutes at 141° C., possessed a tensile strength of 2900 p. s. i. at an elongation of 495%. The polymer prepared in the absence of the thiolacetate showed a tensile strength of 2120 p. s. i. and an elongation of only 250% under similar conditions.

To obtain these desirable properties, it is necessary to form the polymer in an emulsion of high pH. A polymer formed by emulsifying 75 parts of butadiene, 25 parts of styrene and 2.6 parts of the thiolacetate in 180 parts of water containing five parts of soap chips (no excess alkali) and 0.5 part of potassium persulfate and polymerized by heating 16 hours at 50° C. was crepe-like, had poor tack and had very poor mill behavior. The yield was only 35 parts.

The 2,4,4-trimethylpentyl thiolacetate is prepared as disclosed in Langkammerer Serial No. 570,796, filed December 30, 1944, now Patent No.

2,402,560, which likewise discloses the preparation of similar esters.

When the process of the above example was repeated but with other esters of carbothiolic acids of six or more carbons substituted for the trimethylpentyl thiolacetate, the resulting polymerizates, as illustrated by the following table, had good processing properties. Also, vulcanizates of these modified copolymers had better tensile properties than unmodified copolymers when compounded and cured as described in the above example.

| Modifier | Amt. | Hours Polymerized at 40° C. | Yield | Mill Behavior | M/300 | TB/EB |
|---|---|---|---|---|---|---|
| | Per cent | | Per cent | | | |
| 2-(acetylthio)-1,2,3,4-tetrahydronaphthalene | 1 | 16 | 92 | good | 1000 | 2800/570 |
| Do | 1 | 20 | 100 | do | 1450 | 360/500 |
| 2-indanyl thiolacetate | 1 | 10 | 82 | do | | |
| 3-(acetylthio) propyl laurate | 2 | 20 | 96 | do | | |
| Ethyl 11-(acetylthio)-undecylate | 1.5 | 20 | 90 | fair | 1250 | 3300/510 |
| Do | 0.75 | 20 | 81 | do | | |
| None | | 20 | 51 | very poor | | |

The process of the present invention is applicable to the polymerization of monomer compositions containing major amounts of a polymerizable conjugated diene, i. e., a butadiene, including butadiene 1,3, 2-chlorobutadiene-1,3, 2-fluorobutadiene-1,3, and isoprene or mixtures of two or more of these dienes. In the preparation of the synthetic rubber-like materials of this invention such dienes are present in major amounts (at least 50% by weight as based on the total amount of polymerizable monomers present). The polymerizable monomer composition may also include one or more polymerizable monomers having a single omega-methylene group, i. e., a single $CH_2=C=$ group, e. g., acrylonitrile, styrene, vinylnaphthalene, vinylpyridine, vinylfurane, methyl methacrylate, methyl acrylate and higher acrylic and methacrylic esters, vinylidene chloride, and vinylethinylcarbinols such as dimethyl (vinylethinyl) carbinol. In general, preferred synthetic rubber products are obtained when a mixture of butadiene (50–90%) and styrene or acrylonitrile (50–10%) is polymerized in the presence of a thiol ester according to the above described process.

The polymerization of the unsaturated monomer or mixture of monomers is carried out in an aqueous dispersion which for best results is highly alkaline. While the invention is not limited to the use of any one particular emulsion system, the emulsifying agent must be one which is effective under alkaline conditions. As illustrated in the examples, excellent results are obtained with alkali metal salts of oleic acid in the presence of excess caustic. Sodium or potassium salts of other long chain acids such as lauric, palmitic, linoleic, and mixtures of such acids as are used in soap making may be employed. Alkali salts of long chain hydrocarbon sulfonates, sulfonated napthalene condensation products, sulfated oleic esters and the like may also be employed. Non-ionic dispersing agents, including condensation products of ethylene oxide and long chain alcohols, are satisfactory.

For best results, according to the practice of this invention, the pH of the initial emulsion should be above 10.5. Thus, in a soap emulsion, for example, at a pH below about 10.5 much less modification is obtained than in more alkaline emulsion, e. g., pH of 11.0 to 11.5. The pH may be regulated by the use of alkali hydroxides, such as sodium hydroxide, potassium hydroxide, or quaternary ammonium hydroxides, e. g., tetramethylammonium hydroxide.

The polymerization is effected in the normal manner, preferably with such catalysts as sodium, potassium, or ammonium persulfates, potassium percarbonate, benzoyl peroxide, sodium perborate, hydrogen peroxide and the like. The temperature of polymerization may be varied widely, for example between 5° C. and 100° C., but preferably between 20° C. and 70° C.

In the present process of polymerization in an alkaline medium, there is employed as an accelerator of the polymerization and as a modifier of the resultant polymer, an ester of a lower (one to six carbon) acyclic, aliphatic carbothiolic acid having carbothiolic hydrogen replaced by the radical of an alcohol of at least six carbons, the free valence of the radical stemming from carbon, preferably by the radical of an aliphatic alcohol.

Illustrative esters thus having directly attached to carbothiolic sulfur a carbon of an at least six carbon radical preferably aliphatic and preferably acyclic include, in addition to those given above, the hexyl, hetyl, octyl, lauryl, cyclohexyl, benzyl, 2,4,4-trimethylpentyl, 2-indanyl, 3-pinanyl, 11-carbethoxyundecyl, etc., esters of thiolformic, thiolacetic, thiolpropionic, thiolbutyric, thiolvaleric, etc., acids. Thiol esters, for example

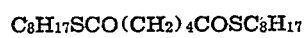
$C_8H_{17}SCO(CH_2)_4COSC_8H_{17}$ in which the acid is polybasic may be used. Esters of heterocyclic alcohols e. g., those having the carbothiolic hydrogen replaced by the

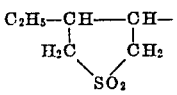

radical, e. g., the thiolacetate, may be used. The preferred esters are esters of noncarbothiolic acids and particularly of thiolacetic acid

$CH_3—CO—SH$ having carbothiolic hydrogen replaced by aliphatic, including cycloaliphatic, radicals of from six to twenty-five carbon atoms, but radicals having from eight to eighteen are even more preferred since better results are obtained therewith. When carbothiolic acid esters are used, wherein carbothiolic hydrogen is replaced by acyclic aliphatic radicals of less than six carbon atoms, the polymerization of the diene or mixture of diene and monoethylenically unsaturated compound is greatly retarded or completely inhibited. The thiolesters of this invention as defined above not only serve as excellent modifiers but also accelerate polymerization.

Rubbery diene polymers and copolymers prepared using the carbothiolic acid esters of mercaptans having six or more carbon atoms are characterized by good processing properties and thus are readily handled in conventional rubber-working machinery. As a result, these polymers are readily fabricated into articles customarily prepared of natural rubber such as tires, tubes, hose, gaskets, hospital sheeting, etc. The above description and examples are intended to be illustrative only. Any modification thereof or variation therefrom which conforms to the spirit of the invention is intended to be included within the scope of the claims.

What is claimed is:

1. In a process of polymerizing a conjugated diene monomer composition containing the diene in amount at least 50% by weight of the polymerizable monomers present, the improvement which comprises exposing the diene composition to polymerizing conditions in an aqueous alkaline medium in the presence of an ester of an acyclic aliphatic monocarbothiolic acid of one to six carbon atoms having carbothiolic hydrogen replaced by the radical of a monohydric alcohol of six to eighteen carbon atoms.

2. In a process of polymerizing a conjugated diene monomer composition containing the diene in amount at least 50% by weight of the polymerizable monomers present, the improvement which comprises exposing the diene composition to polymerizing conditions in an aqueous alkaline medium of pH of 10.5 to 14 and in the presence of an ester of an aliphatic monocarbothiolic acid of one to six carbon atoms in which ester the carbothiolic hydrogen of the acid is replaced by the radical of an aliphatic monohydric alcohol of six to eighteen carbon atoms.

3. Process which comprises exposing to polymerizing conditions a polymerizable monomer composition, in major portion diene, in an aqueous alkaline medium of pH at least 10.5 and in the presence of an ester of an aliphatic monocarbothiolic acid of one to six carbon atoms in which ester an acyclic aliphatic radical of six to eighteen carbon atoms replaces carbothiolic hydrogen.

4. Process which comprises polymerizing a monomeric butadiene composition containing the butadiene in amount of at least 50% by weight of the polymerizable monomers present, in aqueous alkali of pH of at least 10.5 and in the presence of a thiolacetate of an aliphatic monohydric alcohol of six to eighteen carbon atoms.

5. Process which comprises polymerizing a polymerizable monomer composition comprising butadiene-1,3 in major amount by agitating the same in an aqueous alkaline medium of pH of 10.5 to 13.0 containing a peroxygen compound catalyst and a thiolacetate $$CH_3.CO.SR$$

where R is an aliphatic radical of six to eighteen carbon atoms.

6. Process of claim 5 wherein the polymerizable monomer composition comprises styrene and butadiene in the ratio of about one part styrene per three parts butadiene.

7. Process of claim 5 wherein the polymerizable monomer composition comprises acrylonitrile and butadiene in the ratio of about one part acrylonitrile to one to ten parts butadiene.

8. In the process of polymerizing a monomeric conjugated butadiene composition the step of conducting the polymerization in aqueous alkali of pH of at least 10.5 and in the presence of a thiolacetate of an aliphatic monohydric alcohol of six to eighteen carbon atoms.

9. The method which comprises polymerizing a polymerizable butadiene-1,3 hydrocarbon in an aqueous emulsion of pH of 10.5 to 14 and in the presence of an ester of an acyclic aliphatic monocarbothiolic acid of one to six carbon atoms having carbothiolic hydrogen replaced by the radical of an aliphatic alcohol of six to eighteen carbon atoms.

10. The method which comprises copolymerizing butadiene-1,3 and a smaller amount of styrene in an aqueous emulsion of pH of 10.5 to 13.0 and in the presence of a thiolacetate of an aliphatic alcohol of six to eighteen carbons.

11. The method which comprises copolymerizing butadiene-1,3 with about ⅓ its weight of styrene in an aqueous emulsion of pH of 10.5 to 13.0 and in the presence of 2,4,4-trimethylpentyl thiolacetate.

WILLIAM HENRY SHARKEY.

REFERENCES CITED

The following references are of record in the file of this patent:

UNITED STATES PATENTS

| Number | Name | Date |
| --- | --- | --- |
| 1,950,438 | Carothers | Mar. 13, 1934 |
| 2,281,613 | Wollthan | May 5, 1942 |
| 2,366,313 | Browning | Jan. 2, 1945 |
| 2,376,337 | Browning | May 22, 1945 |
| 2,376,338 | Browning | May 22, 1945 |
| 2,378,535 | Brubaker | June 19, 1945 |
| 2,396,997 | Fryling | Mar. 19, 1946 |

Certificate of Correction

Patent No. 2,458,432.  January 4, 1949.

WILLIAM HENRY SHARKEY

It is hereby certified that errors appear in the printed specification of the above numbered patent requiring correction as follows:

Column 1, line 50, after the word "parts" insert *of*; column 2, line 22, for "2 4,4-tri-" read *2,4,4-tri-*; line 35, for "1,25" read *1.25*; columns 3 and 4, in the table, under the heading "Hours Polymerized at 40° C.", third number, for "10" read *20*; same table, under the heading "TB/EB", second number, for "360/500" read *3060/500*; column 3, line 29, for "including butadiene 1,3" read *including butadiene-1,3*; column 4, line 55, for "noncarbothiolic" read *monocarbothiolic*;

and that the said Letters Patent should be read with these corrections therein that the same may conform to the record of the case in the Patent Office.

Signed and sealed this 31st day of May, A. D. 1949.

[SEAL]

THOMAS F. MURPHY,
*Assistant Commissioner of Patents.*